No. 891,357. PATENTED JUNE 23, 1908.
F. J. MOHAN.
MOTOR VEHICLE.
APPLICATION FILED SEPT. 30, 1907.
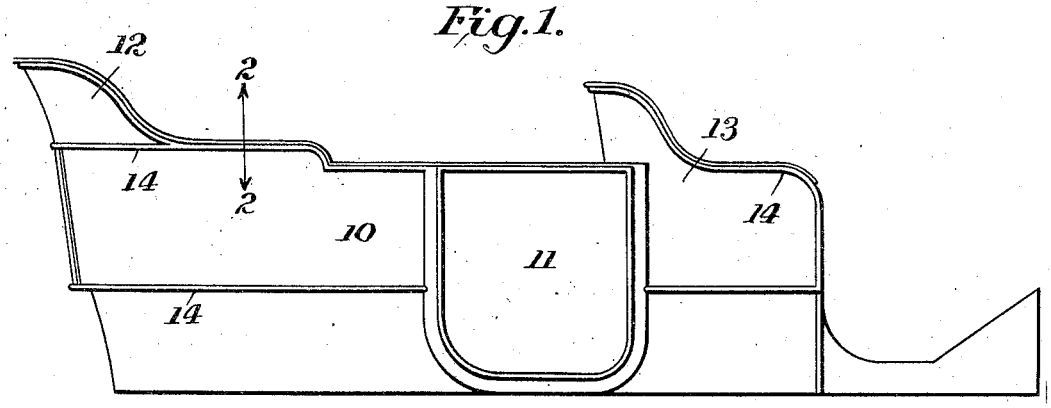
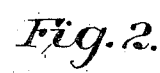
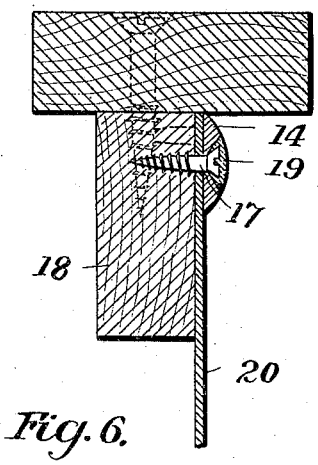
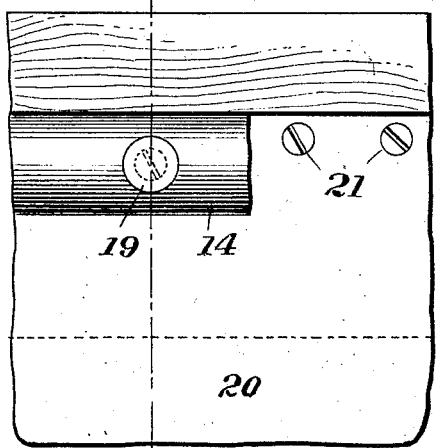
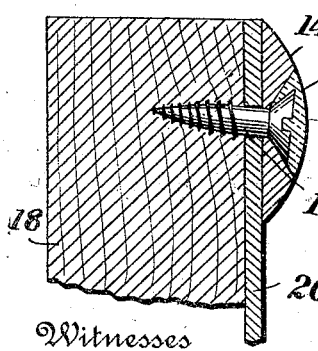
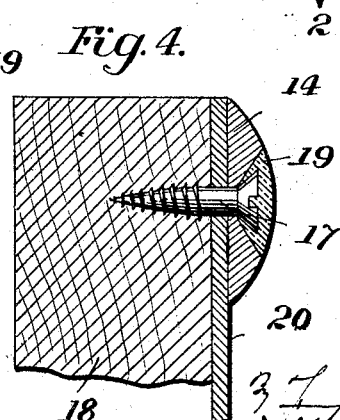
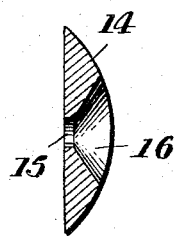
Witnesses
J. G. Hinkel
J. J. McCarthy
Inventor
Frank J. Mohan
By Foster Freeman Watson & Coit
Attorneys

UNITED STATES PATENT OFFICE.

FRANK J. MOHAN, OF DETROIT, MICHIGAN, ASSIGNOR TO PACKARD MOTOR CAR COMPANY, OF DETROIT, MICHIGAN, A CORPORATION OF WEST VIRGINIA.

MOTOR-VEHICLE.

No. 891,357.　　　　Specification of Letters Patent.　　　Patented June 23, 1908.

Application filed September 30, 1907. Serial No. 395,283.

*To all whom it may concern:*

Be it known that I, FRANK J. MOHAN, a citizen of the United States, and resident of Detroit, Wayne county, State of Michigan, have invented certain new and useful Improvements in Motor-Vehicles, of which the following is a specification.

In finishing the bodies of motor vehicles it is customary to use a metal strip or bead as a border to the various panels, such strip usually being segmental in cross section. It has been customary to attach these beads to the bodies of motor vehicles by means of suitable nails having heads which fit countersunk openings in the beads or by means of screws fitting such countersunk openings, the heads of the nails or screws being afterwards filed to conform to the contour of the bead. In finishing the bodies the beads are painted or enameled and it has been found that the severe strains to which automobile bodies are subjected almost invariably loosen the screws or nails or cause them to work with respect to the beads, thereby producing cracks in the enamel at the joints between the screws or nails and the bead and disfiguring the vehicle.

The object of my invention is to obviate these difficulties and I accomplish this object by countersinking the screw holes in the beads to a depth greater than that of the screw heads and with a counter sink having a greater angle or wider pitch than that of the screw head, filling the countersunk hole with solder or other suitable fusible metal and finally shaping the solder to conform to the countour of the bead. By making the angle of the countersink greater than that of the screw head, a portion of the solder flows under the head of the screw and thus anchors the button of solder in the countersunk hole preventing it from falling out in case it should become detached from the bead, which however seldom occurs. The solder in turn enters the slot in the screw head and otherwise attaches itself to the screw, preventing the latter from turning. Thus the button of solder and the screw are interlocked, each holding the other in place.

The invention will be fully described in connection with the accompanying drawing, in which, Figure 1 is a side view or diagram of a motor vehicle body; Fig. 2 is a section on the line 2—2 of Figs. 1 and 3; Fig. 3 is an enlarged view of a portion of Fig. 1, showing details of construction; Fig. 4 is an enlargement of a portion of Fig. 2; Fig. 5 is a section of the bead or trim; and Fig. 6 is a view similar to Fig. 4 showing a slightly modified arrangement of the invention.

Referring to the drawing, 10 indicates the body of an automobile, 11 the side door, 12 the back and side arms of the rear seat and 13 the back and side arms of the forward seat. The body may be constructed entirely of wood but it is customary to construct such bodies of metal plates secured upon a wooden frame, as hereinafter more particularly described. The margins of the body portion are trimmed with a bead 14 to enhance the appearance of the vehicle and portions of the body are sometimes divided in the panels by such beads. As heretofore stated it has been found difficult to secure the bead to the body in such a manner as to prevent the enamel from cracking over or around the screws or other fastening devices. To obviate this difficulty and to more securely hold the bead in place, I attach the same in the following manner: The bead is bored at suitable intervals with holes 15 to receive screws and these holes are countersunk with a wide-angled countersink forming conical openings 16, as shown in Fig. 5. The angle of the opening 16 should be greater than the angle or pitch of the head of the screw 17 which is used to fasten the bead to the frame 18 of the body, thus leaving a space under the screw head between said head and the wall of the opening 16, as shown in Figs. 4 and 6. After the bead, thus prepared, has been fastened to the body or door or other part to be trimmed by screws 17, the cavity 16 is filled with solder or other suitable easily fusible metal or alloy 19, the cavity and screw head being first treated with a suitable flux or material to cause the fusible metal to adhere. Sufficient heat is applied to cause the fusible metal to flow around the screw head and completely fill the cavity. When cooled the surplus fusible metal is removed and its surface finished with a file or other tool to conform accurately with the surface of the bead.

As shown in Fig. 4 the screw 17 is symmetrically arranged in the conical cavity 16, thus providing an annular space between the screw head and the wall of said cavity, while in Fig. 6 the screw is inclined, its head resting on the bead at one side, thus providing a crescent-shaped cavity between the screw head and the bead. It will be observed that in either case the button 19 of fusible metal is anchored to the screw head and cannot fall out even though it should become loose from the bead. The button however will almost invariably adhere permanently to the bead, and perform the function of locking the screw against turning.

As shown in the drawing, the panels are covered with metal plates 20 which are secured at their margins to the frame 18, by screws or other suitable fastenings 21. The beads are then placed over the metal plates and arranged to cover the fastenings 21, thus serving the double purpose of a trimming for the body and for covering the fastenings 21 and preventing them from loosening or dropping out.

I am aware that it has been proposed to cover screw heads with cylindrical or other plugs inserted in the wood above the screw and believe that such devices have been used upon ordinary carriages; but the rough usage to which automobiles are subjected tends to loosen the screws and loosen plugs of this character, thus cracking the enamel and disfiguring the vehicle. It will be understood that the bead or strip used in carrying out my invention is made of metal to which a fusible metal or alloy, such as solder will adhere. I preferably use brass for this purpose. When a bead is put on according to the method herein described and properly finished, the fastenings cannot be detected and the enamel presents a smooth unbroken surface throughout the length of the bead.

Having described my invention what I claim and desire to secure by Letters Patent is, 1. In a vehicle body, the combination with the body, of a metal bead or strip and securing screws passing through said strip into the body, the said strip having countersinks larger than the screw heads, and fusible metal buttons filling said countersinks, for the purpose set forth.

2. In a vehicle body, the combination with the body, of a metal bead or strip and securing screws passing through said strip into the body, the said strip having countersinks larger than the screw heads, and fusible metal buttons filling said countersinks and extending under the screw heads, for the purpose set forth.

3. In a vehicle body, the combination with the body, of a metal bead or strip and securing screws passing through said strip into the body, the said strip having countersinks larger than the screw heads, and fusible metal buttons filling said countersinks and extending under the screw heads and into the slots thereof, for the purpose set forth.

4. In a vehicle, the combination with the body, of a metal bead having countersunk screw holes, screws extending through said holes into the body, the countersinks in the bead having a wider pitch or angle than the pitch of the screw heads and being deeper than said screw heads, whereby spaces are created between the under sides of the screw-heads in the walls of the countersinks, and fusible metal buttons filling said countersinks, including the spaces in and around the screw heads, the said buttons being finished on their outer surface to conform to the beads.

5. In vehicle construction, the combination with the body frame, of metal plates forming a sheathing on said frame, screws passing through the margins of said plates for attaching the plates to the frame, beads covering said screws to hide the same and prevent their displacement, and screws extending through the beads and the plates into the frame, the beads having countersinks to receive the heads of said latter screws, said countersinks having a greater angle or pitch than the screw heads and being filled with fusible metal, whereby all of said parts are securely and permanently connected together, for the purpose set forth.

In testimony whereof I affix my signature in presence of two witnesses.

FRANK J. MOHAN.

Witnesses:
 MILTON TIBBETTS,
 CLARA DALE.